Sept. 15, 1970  A. C. LANGER  3,528,690
FASTENER
Filed Aug. 6, 1969

INVENTOR
Alfred C. Langer
BY
Dominik, Knechtel & Godula
ATTYS.

United States Patent Office 3,528,690
Patented Sept. 15, 1970

3,528,690
FASTENER
Alfred C. Langer, Pleasant Rise 2,
Brookfield, Conn. 06804
Continuation-in-part of application Ser. No. 677,201,
Oct. 23, 1967. This application Aug. 6, 1969, Ser.
No. 847,956
Int. Cl. F16b 5/00
U.S. Cl. 287—20.927      7 Claims

ABSTRACT OF THE DISCLOSURE

A fastener formed of a base plate and an actuator which are adapted to be affixed together, with a spring latch disposed between them. The actuator has an eccentric integrally formed with it for operating the spring latch, to lockingly engage the latter with an anchor rod. Thumb-wings are provided on the actuator to permit it to be operated by hand, without the need of additional tools of any kind. Key slots are also provided, and can be used if desired, to operate it. The fastener can be affixed flat against any flat surface.

---

This application is a continuation-in-part of U.S. patent application, Ser. No. 677,201, filed Oct. 23, 1967, by Alfred C. Langer, now U.S. Pat. No. 3,484,832.

This invention relates to fasteners, for removably securing various type objects together.

In U.S. Pat. 3,309,115 there is disclosed a method and fasteners for removably securing panels, or other elements, together. In U.S. patent application, Ser. No. 677,201, there is disclosed another fastener which is generally like the fasteners disclosed in said patent, however, the fasteners have been substantially modified and improved by providing a new shaft assembly for them. These shaft assemblies permit the fasteners to be more easily handled and installed in a panel, and furthermore, are extendable to accommodate various panel dimensions and applications.

The fasteners of the present invention are generally like those disclosed in the above-mentioned U.S. Pat. 3,309,115 and U.S. patent application, Ser. No. 677,201, however, again the fasteners have been substantially modified and improved, to permit them to be hand-operated without the use of additional tools and to substantially reduce fabrication costs. Also, the present construction is such that the applications for the fasteners are substantially broadened and now include knock-down furniture and the like, releasable locks for covers or lids on boxes, crates and the like, as well as numerous other applications where flat surface mounting is necessary or desirable.

It is therefore an object of this invention to provide improved fasteners for attaching elements together.

It is a further object to provide improved fasteners for attaching various elements together which may be easily installed in the factory, or in the field by persons without great skill, and without special tools.

Another more specific object is to provide improved fasteners which can be hand-operated without the need of additional tools.

Still another object is to provide improved fasteners which are adapted to be mounted against a flat surface.

A still further object is to provide improved fasteners which are of a relatively simple and inexpensive construction, and which are relatively simple to assemble.

Other objects of the invention will in part be obvious and will in part appear hereinafter.

The above objectives are accomplished with a fastener formed of a base plate and an actuator which are adapted to be affixed together, with a spring latch disposed between them. The actuator has an eccentric integrally formed with it for operating the spring latch, to lockingly engage the latter with an anchor rod. Thumb-wings are provided on the actuator to permit it to be operated by hand, without the need of additional tools of any kind. Key slots are also provided, and can be used if desired, to operate it. The fastener can be affixed flat against any flat surface.

The invention accordingly comprises the apparatus embodying features of construction, combination of elements and arrangement of parts, all as exemplified in the following detailed disclosure, and the scope of the invention will be indicated in the claims. For a fuller understanding of the nature and objects of the invention, reference should be had to the following detailed description taken in conjunction with the accompanying drawings, in which:

Similar reference characters refer to similar parts throughout the several views of the drawings.

Figure 1:
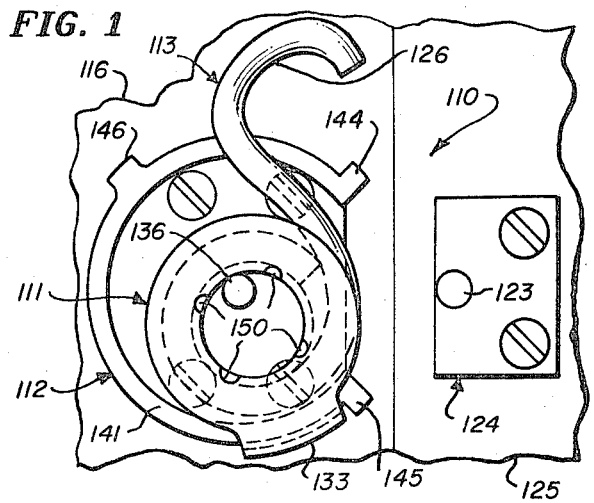
FIG. 1 is a side plan view of a fastener exemplary of the invention.
Figure 5:
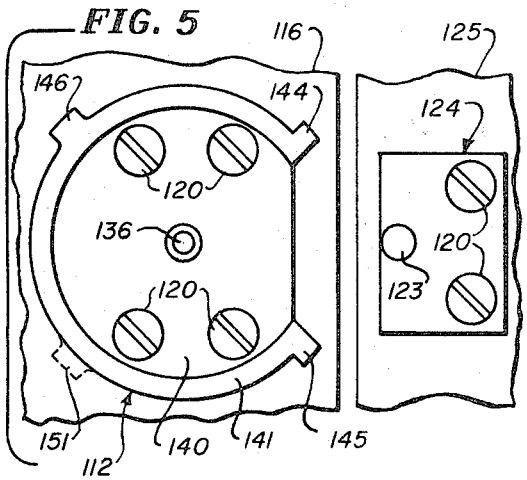
FIG. 5 is a side plan view of the fastener, with the actuator removed.
Figure 6:
FIG. 6 is a side plan view of the spring latch of the fastener.
Figure 7:
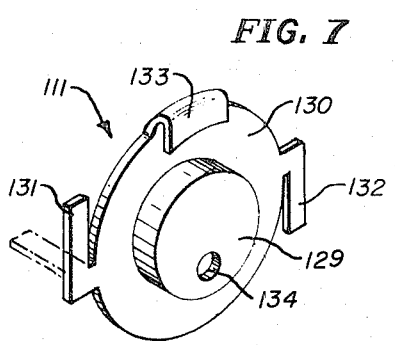
FIG. 7 is a perspective view of the actuator of the fastener.
Figure 8:
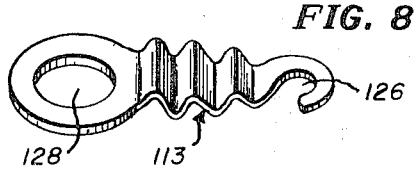
FIG. 8 is a perspective view of an alternative spring latch.

Referring now to the drawing, there is disclosed a fastener 110 which includes an actuator 111 (FIG. 7), a base plate 112 (FIG. 5) and a spring latch 113 (FIGS. 6 and 8). The fastener 110 is assembled, as described more fully below, and can be affixed flat against an object 116 which may be a panel, a side wall of a chest, a part of a knock-down piece of furniture, or other object. Fastening can be accomplished by means of threaded screws 120 extended through apertures provided in the base plate 112, as illustrated, or alternatively by means of rivets. It also could be affixed to the object 116 in any one of a number of other different manners, including spot welding if the object 116 is of metal. An anchor rod 123 formed integral with or affixed to a mounting plate 124 is affixed to another object 125 in a suitable fashion, for example, by means of threaded screws 120 extended through apertures provided in the mounting plate. The anchor rod 123, of course, is positioned so that the fastener 110 can be activated to lockingly engage the spring latch 113 with the anchor rod 123, to lock the two objects 116 and 125 together.

More specifically, the spring latch 113 can be formed from a single length of a spring steel rod, as illustrated in FIG. 6, or it can be formed from a single length of flat spring steel stock, as illustrated in FIG. 8. The spring steel rod is bent to form a hook 126 on its one end which is adapted to lockingly engage with the anchor rod 123, and its opposite end is reversely folded so as to form a substantially closed circle 128 for receiving the circular-shaped projecting eccentric 129 (FIG. 7) of the actuator 111. The flat spring steel stock, as can be seen in FIG. 8, is stamped to form a hook 126 and an opening 128 which function in the same manner as the above-described hook 126 and substantially closed circle 128, respectively. The main body portion of the spring latch 113 is formed with a number of accordian-like pleats or folds so that it is resilient and will function in the manner described below.

The actuator 111, as illustrated, is formed from a single blank of metal sheet material by, for example, stamping the latter, to form the circular-shaped projecting eccentric 129 centrally within a facing plate 130. Alternatively, the actuator 111 can be molded of plastic or formed from other suitable materials, such as powdered metal. A pair of thumb-wings 131 and 132 are integrally formed with the facing plate 130, preferably at diametrically opposite positions on its peripheral edge. A reversely folded locking tab or flange 133 also is integrally formed thereon, on its peripheral edge centrally spaced between the thumb-wings 131 and 132. An aperture 134 is provided in the eccentric 129, and is axially off-center so that the actuator 111 when affixed to the base plate 112 by means of a rivet 135 or the like extended through the aperture and an aperture 136 in the base plate will function to operate the spring latch 113 in the manner described below.

Figure 4:
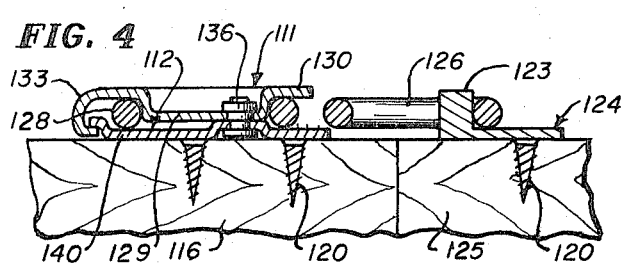
FIG. 4 is a sectional view taken along lines 4—4 of FIG. 2.

The base plate 112 also can be formed from a single blank of metal sheet material by, for example, stamping it. Alternatively, it too can be molded of plastic or formed from other suitable materials. As can be best seen in FIGS. 4 and 5, the base plate 112 includes a flat generally circular-shaped rear wall 140 and an annular upwardly or outwardly bent locking flange 141. The latter is disposed to lockingly and slidingly receive the locking tab 133 on the actuator 111 behind it, as can be best seen in FIG. 4. Apertures are formed in the rear wall 140 for receiving the threaded screws 120, and the aperture 136 for receiving the rivet 135 for affixing the actuator 111 and the base plate 112 together is formed at the axial center thereof. It may be noted, in FIG. 4, that the area about the aperture 136 is formed so that the fastener 110 can be affixed flush against the surface of the object 116, with the rivet 135 affixed thereto. A pair of stop lugs 144 and 145 and an overcenter stop dog 146 are integrally formed on the locking flange 141, and are engageable by the locking tab 133 on the actuator 111 to arrest the rotation of the latter, as described more fully below.

In assembling the fastener 110, the eccentric 129 of the actuator 111 is fitted within the circle 128 of the S-shaped spring latch 113. Then, the spring latch and the eccentric are affixed to the base plate 112 by engaging the locking tab 133 behind the locking flange 141 and extending the rivet 135 through the apertures 134 and 136 and securing it therein. Assembly is now complete, and the fastener 110 can be affixed to the object 116 with, for example, threaded screws 120 extended through the apertures in the base plate 112. The mounting plate 124 having the anchor rod 123 thereon is affixed to the other object 125 in a position to be engaged by the spring latch 113, to complete the installation.

Figure 2:
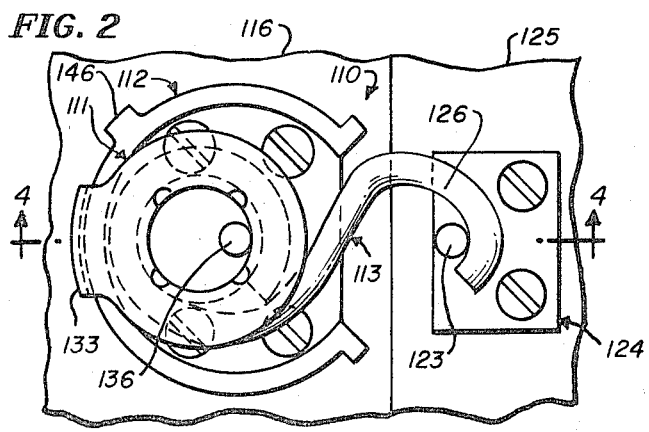
FIG. 2 is a similar side plan view, illustrating the fastener in a first operative latching position.
Figure 3:
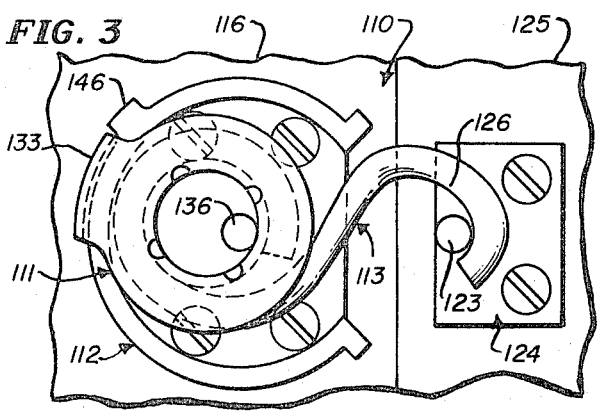
FIG. 3 is still another similar side plan view illustrating the fastener in a second operative locking position.

The two objects 116 and 125 are abutted together or closed and the fastener 110 then is operated to lock them together by rotating the actuator 111. As the actuator is rotated, the eccentric 129 on it causes the spring latch 113 to rotate. The actuator 111 is rotated by gripping the thumb-wings 131 and 132 which are bent perpendicular to the actuator, as illustrated in FIG. 7, to permit them to be more easily gripped. As the hook 126 engages the anchor rod 123, as illustrated in FIG. 2, and the actuator 111 is continued to be rotated, the eccentric 129 tensions the spring latch 113, causing the objects 116 and 125 to be tightly drawn together. At an over-the-center point, further rotation of the actuator 111 is stopped by the locking tab 133 engaging the stop dog 146, as illustrated in FIG. 3. In this position, the spring latch effectively locks and holds the objects together, under a compressive force, so that edges between them are held tightly together.

To release and to retract the spring latch 113, the actuator 111 is operated in a counter-clockwise direction. The eccentric 129 releases the tension on the spring latch 113, and as the actuator is continued to be rotated eventually functions to disengage the spring latch 113 from the anchor rod 123. Counter-clockwise rotation is stopped when the locking tab 133 engages the stop lug 145.

As indicated above, the actuator 111 is provided with key slots in the form of recessed radially spaced grooves 150, formed in the side wall of the eccentric 129. A key can be inserted within pairs of these key slots to actuate the actuator, if desired. The base plate 112 also may have an alternate stop dog 151, as illustrated in FIG. 5, for left-handed fasteners. This stop dog 151 is ground-off, if not used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. Fastening means for securing together two objects comprising anchor means secured to one of said objects, a fastener secured to the other one of said objects comprising a base plate, an actuator having an eccentric integrally formed therewith rotatably affixed to said base plate and a spring latch rotatably secured between said base plate and said actuator, one end of said spring latch being formed for receiving said eccentric of said actuator therein, said actuator being generally circular-shaped and having a recessed circular-shaped pocket formed centrally thereof and a reversely folded tab formed integrally along the peripheral edge thereof, said pocket forming said eccentric, an aperture in said pocket forming said eccentric disposed off-center from the central axis thereof, and means on said actuator for rotatably operating it, said base plate being generally circular-shaped and having a locking flange formed about its peripheral edge adapted to receive said tab on said actuator beneath it, an overcenter stop dog integrally formed with said locking flange disposed to be engaged by said tab on said actuator to prevent further rotation of the latter, an aperture axially formed in said base plate, pin means for rotatably securing said actuator to said base plate extended through and secured with said aperture in said pocket forming said eccentric and said aperture in said base plate, said eccentric on said actuator when the latter is operated causing said spring latch to rotate through its arc of excursion to engage said anchor means and to resiliently and forcibly urge said objects together, whereby said two objects are forcibly and resiliently urged together.

2. The fastening means of claim 1, wherein said fastener is adapted to be fixed flat against a surface by means of threaded screws extended through apertures formed in said base plate.

3. The fastening means of claim 1, wherein said base plate and said actuator each are formed as integral units of sheet metal material.

4. The fastening means of claim 1, wherein said means for rotating said actuator comprises a pair of thumb-wings integrally formed therewith about the peripheral edge thereof, said thumb-wings being bendable angularly outwardly to permit them to be more easily gripped.

5. The fastening means of claim 1, wherein said means for rotating said actuator comprises key-slots formed in the side wall of said recessed pocket forming said eccentric.

6. The fastening means of claim 1, further including stop lugs on said base plate for limiting the angular rotation of said actuator.

7. The fastening means of claim 1, wherein said eccentric on said actuator when the latter is operated causing said spring latch to rotate through its arc of excursion to engage said anchor means, the eccentricity of eccentric on said actuator in a first predetermined position tensioning said spring latch to resiliently and forcibly urge said objects together and in a second overcenter position of said eccentric on said actuator the tension of said spring latch in combination with the eccentricity of said eccentric on said actuator causing said actuator to be forcibly urged in the same direction of rotation to a position at which its rotation is arrested to effectively lock said spring latch in a positive forced engagement with said anchor means whereby said two objects are forcibly and resiliently urged together.

References Cited

UNITED STATES PATENTS

| 2,853,751 | 9/1958 | Schlueter | 292—111 X |
| 3,191,244 | 6/1965 | Burke | 287—20.924 |
| 3,204,993 | 9/1965 | Swanson | 292—111 |
| 3,281,169 | 10/1966 | Houvener | 287—20.924 |
| 3,377,091 | 4/1968 | Pastva | 292—111 X |

FOREIGN PATENTS 556,863  4/1923  France.

DAVID J. WILLIAMOWSKY, Primary Examiner

W. L. SHEDD, Assistant Examiner

U.S. Cl. X.R.

287—20.92; 292—111